United States Patent
Tonar et al.

(10) Patent No.: US 11,054,562 B2
(45) Date of Patent: Jul. 6, 2021

(54) POLARIZED ILLUMINATION SYSTEMS

(71) Applicant: Gentex Corporation, Zeeland, MI (US)

(72) Inventors: William L. Tonar, Holland, MI (US); David J. Cammenga, Zeeland, MI (US); Kurtis L. Geerlings, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 190 days.

(21) Appl. No.: 16/111,353

(22) Filed: Aug. 24, 2018

(65) Prior Publication Data
US 2019/0064414 A1    Feb. 28, 2019

Related U.S. Application Data

(60) Provisional application No. 62/551,926, filed on Aug. 30, 2017.

(51) Int. Cl.
G02B 5/30 (2006.01)
G02B 5/22 (2006.01)
G02B 5/26 (2006.01)
F21V 8/00 (2006.01)

(52) U.S. Cl.
CPC ............. *G02B 5/3025* (2013.01); *G02B 5/22* (2013.01); *G02B 5/26* (2013.01); *G02B 6/0006* (2013.01); *G02B 6/0008* (2013.01)

(58) Field of Classification Search
CPC ... G02B 5/20; G02B 5/22; G02B 5/28; G02B 5/30; G02B 6/02
See application file for complete search history.

(56) References Cited

U.S. PATENT DOCUMENTS

| 2006/0023215 | A1  | 2/2006  | Berner |
| 2008/0130108 | A1* | 6/2008  | Bayer ............... A61B 1/00096 359/489.07 |
| 2014/0303463 | A1  | 10/2014 | Robinson et al. |
| 2016/0143519 | A1  | 5/2016  | Harris |
| 2019/0277481 | A1* | 9/2019  | Koyama ............... A42B 3/044 |

FOREIGN PATENT DOCUMENTS

| JP | 2000075246 A  | 3/2000 |
| JP | 2008500536 A  | 1/2008 |
| JP | 2016007273 A  | 1/2016 |
| WO | 1997028429 A1 | 8/1997 |
| WO | 2010028185 A2 | 3/2010 |
| WO | 20140180876 A1| 11/2014 |

* cited by examiner

Primary Examiner — Robert E. Tallman
(74) Attorney, Agent, or Firm — Price Heneveld LLP; Bradley D. Johnson

(57) ABSTRACT

An illumination system is provided that includes a light source configured to emit a first handedness polarization of light onto a body, the first handedness polarization of light having at least one of a circular and an elliptical polarization. The body reflects a second handedness polarization of light. An optical filter is configured to at least one of absorb and reflect the second handedness polarization of light and transmit the first handedness polarization of light.

20 Claims, 3 Drawing Sheets

POLARIZED ILLUMINATION SYSTEMS

CROSS-REFERENCE TO RELATED APPLICATION

This application claims the benefit of and priority to U.S. Provisional Patent Application No. 62/551,926, filed on Aug. 30, 2017, entitled POLARIZED ILLUMINATION SYSTEMS, the entire disclosure of which is hereby incorporated herein by reference.

FIELD OF THE DISCLOSURE

The present disclosure generally relates to illumination systems, and more particularly, to polarized illumination systems.

BACKGROUND OF THE DISCLOSURE

Glare arising from the use of artificial lighting may present issues in a variety of circumstances. Glare may negatively affect the ability of a viewer to properly perceive structures or features of a surface. The issue of glare may be compounded when illuminating environments having excess moisture and/or surfaces which are prone to producing specular reflections. As such, traditional artificial lighting may necessarily be repeatedly moved to provide adequate illumination while reducing glare. Such repeated moving may increase the cost and complexity of performing a task.

SUMMARY OF THE PRESENT DISCLOSURE

According to one aspect of this disclosure, an illumination system is provided that includes a light source configured to emit a first handedness polarization of light onto a body, the first handedness polarization of light having at least one of a circular and an elliptical polarization. The body reflects a second handedness polarization of light. An optical filter is configured to at least one of absorb and reflect the second handedness polarization of light and transmit the first handedness polarization of light.

According to another aspect of this disclosure, an imaging system is provided that includes a light source optically coupled to a first end of an optical fiber and configured to emit a first handedness polarization of light into an optical fiber. The optical fiber is configured to emit the first handedness polarization of light through a second end of the optical fiber onto a body and the body reflects a second handedness polarization of light. An imager is positioned proximate the optical fiber. An optical filter configured to at least one of absorb and reflect the second handedness polarization of light incident on the optical filter and transmit the first handedness polarization of light incident on the optical filter.

According to another aspect of this disclosure, a method of illuminating body tissue, includes the steps of: emitting a first handedness polarization of light from a light source; impinging the first handedness polarization of light on the body tissue; reflecting a second handedness polarization of light from the body tissue; transmitting a portion of the first handedness polarization of light through an optical filter; and absorbing a portion of the second handedness polarization of light by the optical filter.

These and other aspects, objects, and features of the present disclosure will be understood and appreciated by those skilled in the art upon studying the following specification, claims, and appended drawings. It will also be understood that features of each example disclosed herein may be used in conjunction with, or as a replacement for, features of the other examples.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
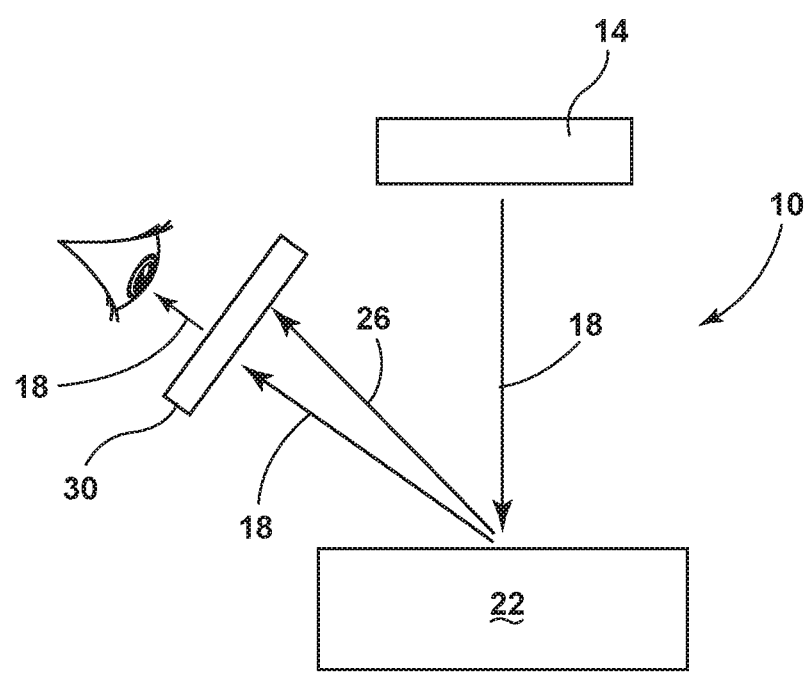
FIG. 1 is a schematic view of an illumination system, according to one or more examples.
Figure 2A:
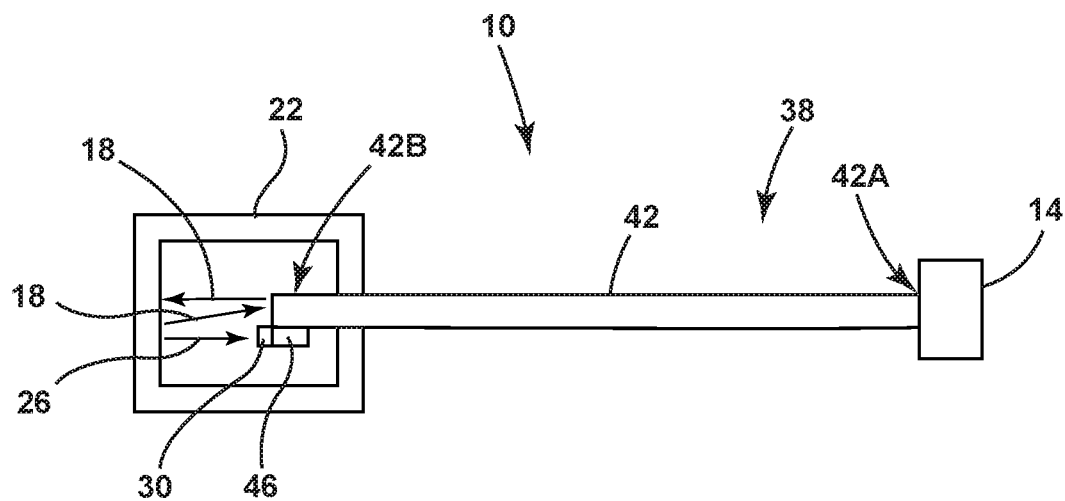
FIG. 2A is a schematic view of an imaging system, according to one or more examples.
Figure 2B:
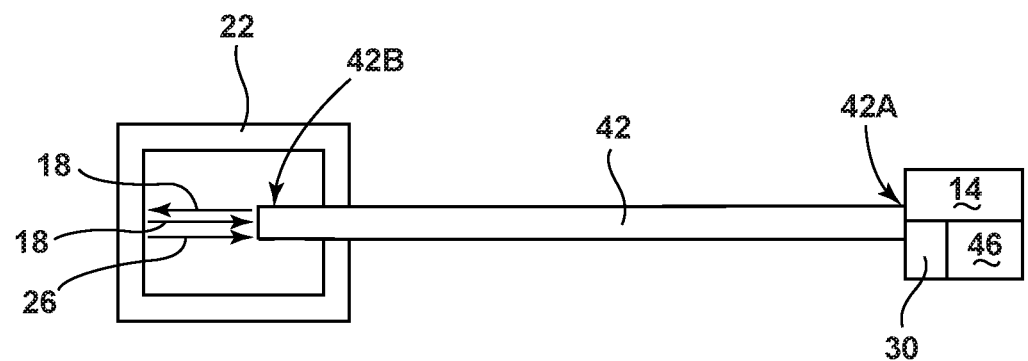
FIG. 2B is a schematic view of an imaging system, according to another example.
Figure 3:
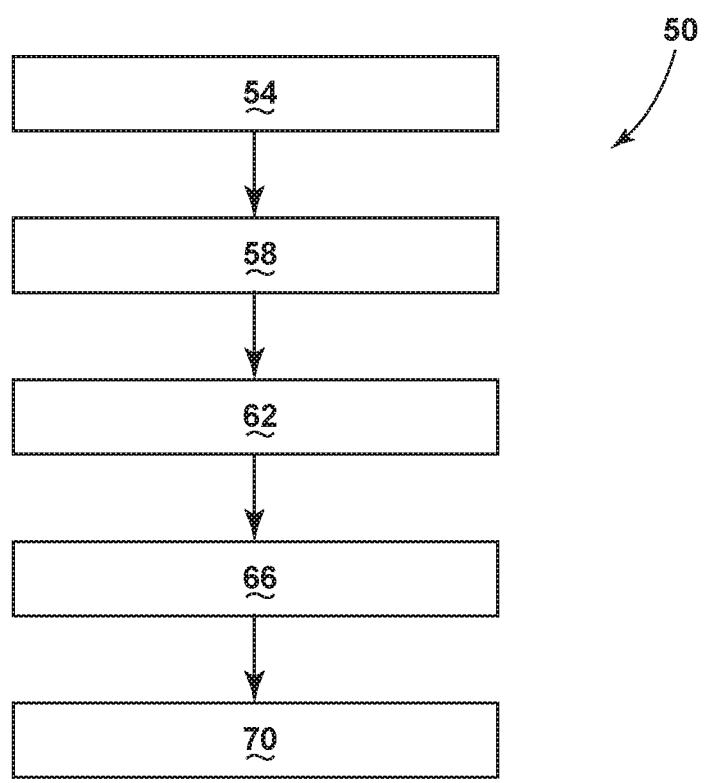
FIG. 3 is a flow chart, according to one or more examples.

Referring now to FIGS. 1-3, reference numeral 10 generally designates an illumination system. The illumination system 10 may include a light source 14 configured to emit a first handedness polarization of light 18 onto a body 22. According to various examples, the body 22 reflects a second handedness polarization of light 26. An optical filter 30 is configured to at least one of absorb and reflect the second handedness polarization of light 26 and transmit the first handedness polarization of light 18. It will be understood that other polarizations of light may be transmitted by the optical filter 30 without departing from the teachings provided herein.

Referring now to FIG. 1, the illumination system 10 of the present disclosure may be utilized in a variety of environments. For example, the illumination system 10 may be utilized in a surgical suite, automobile repair areas, dentistry, photography studios, manufacturing settings, as well as other areas where a tradeoff between illumination level and specularly reflected glare reduction takes place. In general, the reflection of ambient light impinging on a surface at an angle nearer to normal (e.g., <45° to perpendicular) does not result in the polarization of the reflected light. As used herein, "specular reflection" is the mirror-like reflection of light rays from a surface at the same angle to a normal vector of the surface as the incident ray, but on the opposing side of the normal vector. The refection of ambient light impinging on a surface at a high angle (e.g., >45° relative to normal) can be linearly polarized and this reflected light is often perceived as glare. The perceived glare caused by high angle incidence of ambient light can be removed with a properly orientated absorbing or reflecting linear polarizer. This technique is commonly used in photography today. However, since ambient light reflected off of a surface at nearer to normal angles is not polarized this technique will not remove reflected glare from those surfaces. If a surface is illuminated at nearer to normal angles with polarized light of one handedness (e.g., circular or elliptical), light specularly reflected off of a surface at normal incidence is converted to the second handedness of polarization. Light specularly reflected from a surface can be perceived as glare. This perceived glare can be removed by filtering out the second handedness of polarization with an optical filter. Circularly polarized light specularly reflected off of a surface at non-normal incidence may be converted to elliptical polarization of the opposite handedness, which may still be blocked partially by an appropriate optical filter. Blocking the reflected circularly polarized light with an optical filter (circular polarizer) may be insensitive to the angle of the filter.

According to various examples, the light source 14 is a light engine capable of producing un-polarized and/or polarized light of one handedness including, but not limited to, certain liquid crystal displays (LCDs), laser diodes, light-emitting diodes (LEDs), incandescent light sources, halogen light sources, organic light emitting diodes (OLEDs), other types of light sources 14 and/or combinations thereof. In polarized light examples of the light source 14, the light source 14 is configured to emit the first handedness polarization of light 18. According to various examples, the first handedness polarization of light 18 may have a circular polarization and/or an elliptical polarization. In electrodynamics, circular polarization of light is a polarization state in which, at each point, the electric field of the light wave has a constant magnitude, but its direction rotates with time at a steady rate in a plane perpendicular to the direction of the wave. A circularly polarized wave can be in one of two possible states, right handedness circular polarization in which the electric field vector rotates in a right-hand sense with respect to the direction of propagation, and left handedness circular polarization in which the vector rotates in a left-hand sense. Using the handedness convention, left or right handedness is determined by pointing one's left or right thumb toward the source, against the direction of propagation, and then matching the curling of one's fingers to the temporal rotation of the field. Elliptically polarized light may also be described as having a handedness in a substantially similar manner to that of the circularly polarized examples, but the electric vector varies in magnitude during rotation. Circular polarization of the light may be achieved when linearly polarized light from the light source 14 passes through an integral or separate ¼ wave plate. Additionally or alternatively, a reflective polarizer may be utilized. If a reflective polarizer is used on the light source 14, as opposed to an absorbing polarizer, the light emitted by the light source 14 that is the "wrong" polarization (e.g., the second handedness polarization of light 26) is reflected back into the light source 14 where it can be "depolarized" and reflected back toward the polarizer.

Exemplary reflective polarizers may include a multilayer plastic film such as a dual brightness enhancement film (DBEF) polarizer and/or a liquid crystal material. In examples of the reflective polarizer incorporating the liquid crystal material, the liquid crystal material may be a cholesteric liquid crystal material. In other words, the liquid crystal polymers may have a helical structure known as a pitch. In such examples, the reflective polarizers may have a pitch from 400 nm to about 750 nm. In liquid crystal examples of the reflective polarizers, the reflective polarizers may be composed of multiple layers (e.g., each cast separately in sequence). The reflective polarizers may have a thickness of from about 6 μm and about 24 μm, or from about 8 μm and about 16 μm. In a specific example, the reflective polarizers may have a thickness of about 12 μm. The reflective polarizers may be composed of a plurality of layers, each having different or the same optical properties (e.g., wavelength band of reflection, absorption, scattering and/or transmission). The reflective polarizers may have between 1 and about 1000 layers. In a specific example, the reflective polarizers may include four layers. It will be understood that each layer may contain sublayers which aid in the polarization, reflection, scattering, transmission and/or absorption of light. Each of the sublayers may have a thickness of from about 10 nm to about 5.0 μm. Further, it will be understood that the reflective polarizers may be used in conjunction with a quarter-wave plate to produce circularly polarized light or an optical retarder to produce elliptically polarized light.

A portion, a majority, substantially all or all of the light emitted from the light sources 14 may polarized. For example, the percentage of light emitted from the light source 14 which is polarized may be about 1%, or about 5%, or about 10%, or about 15%, or about 20%, or about 25%, or about 30%, or about 35%, or about 40%, or about 45%, or about 50%, or about 55%, or about 60%, or about 65%, or about 70%, or about 75%, or about 80%, or about 85%, or about 90%, or about 95% or about 99% or about 100% or any and all values and ranges between these values. For example, the percentage of light which is emitted from the light source 14 as polarized may be from about 1% to about 100%, or from about 1% to about 20%, or from about 1% to about 50%, or about 25% to about 50%, or from about 50% to about 75%, or about 75% to about 100%. It will be understood that the percentage of light which exits the light source 14 as polarized may be adjusted during operation of the light source 14. For example, the percentage of light which is polarized may be increased or decreased during operation of the light source 14. Further, it will be understood that the polarization of the light may be changed during operation of the light source 14 without departing from the teachings provided herein.

According to various examples, the light source 14 may be a component of a larger assembly. For example, the light source 14 may be a component of an artificial light assembly such as overhead lighting, ceiling lights, surgical lighting, area lighting, fiber optic assemblies and/or other lighting assemblies. As explained above, the light source 14 is configured to emit the first handedness polarization of light 18 onto and/or into the body 22. Further, the larger assembly within which the light source 14 is positioned may include a plurality of light sources 14. In such an example, each of the light sources 14 may emit a different polarization of light 18 or a different percentage of the light 18 may be polarized. Further, some of the light sources 14 may be adjustable (e.g., either in orientation and/or percent polarization).

The body 22 may take a variety of configurations. According to various examples, the body 22 is a structure with areas that tend to reflect light in a specular manner. In some examples, the body 22 may include one or more living or dead tissues. In tissue examples of the body 22, the tissues may include human, animal, plant and/or other tissues. According to various examples, the tissues of the body 22 may include, or partially be composed of, water. The water of the tissues may take the form of moisture, a film, blood, sap, and/or other bodily fluids present within and on an exterior surface of the body 22. For example, the water may be present as a thin layer of moisture or pooled liquid in a cavity of the body 22.

The body 22 is illuminated by the first handedness polarization of light 18 from the light source 14. The body 22 is configured to reflect the first handedness polarization of light 18, the second handedness polarization of light 26 and light that is not polarized. As explained above, the first handedness of polarization 18, once specularly reflected off of the body 22 (e.g., due to the moisture or water present within and/or on the body 22) may reverse in handedness to form the second handedness polarization of light 26 and be perceived by a human and/or machine observer as glare. Generally glare is the effect caused by the specular reflection of illumination light off of a smooth surface such as a surface film of water. This glare can visually mask the details of the object below the reflecting surface and can obscure surrounding objects because the "glare" image appears brighter than surrounding objects. As such, viewers may not be able to discern important features and/or objects under the reflecting surface. The reflected second handedness polarization of light 26 may be opposite from the first handedness polarization of light 18. In examples where the first handedness polarization of light 18 is circularly polarized, the first and second handedness polarizations of light 18, 26 are circularly polarized opposite from one another. In other words, the first and second handedness polarizations of light 18, 26 may have an opposite handedness (e.g., left handedness and right handedness). In examples where the first handedness polarization of light 18 is elliptically polarized, the first and second handedness polarizations of light 18, 26 are elliptically polarized opposite from one another. In other words, the first and second handedness polarizations of light 18, 26 may have an opposite handedness (e.g., left handedness and right handedness). The glare, or second handedness polarization of light 26, may be formed or reflected by the water present on the body.

The optical filter 30 is configured to reflect and/or absorb the second handedness polarization of light 26. According to some examples, the optical filter 30 may be positioned separate and away from the light source 14. For example, the optical filter may take the form eyewear (e.g., goggles, eye glasses), headwear (e.g., a face shield, helmet, visor, etc.), a screen (e.g., a pane or other at least partially transmissive member positionable between the body 22 and a viewer) other configurations and/or combinations thereof. In other examples, the optical filter 30 may be combined with the light source 14. For example, the light source 14 may be coupled with the optical filter 30 in a light assembly. In such an example, the optical filter 30 may provide a viewing port or window through the light assembly.

The optical filter 30 may include one or more reflective polarizers and/or absorptive polarizers. In such examples, the optical filter 30 may be referred to as a polarizer. Reflective polarizer examples may include a wire grid polarizer plus a quarter wave plate or optical retarder, a multilayer plastic film such as a dual brightness enhancement film (DBEF) polarizer with a quarter wave plate, an optical retarder and/or a liquid crystal material. It will be understood that liquid crystal examples of the optical filter 30 may be substantially similar to that described above in connection with the light source 14. DBEF film or absorbing polarizer examples of the optical film 30 may have a transmittance of ambient light and/or the first handedness polarization of light 18 incident on the optical filter 30 of about 5%, 10%, 20%, 30%, 40%, 45%, 49%, 50%, 60%, 70%, 80%, 90% or greater than about 99% or any and all values and ranges between these values. For example, transmission of the first handedness of polarization of light 18 may be from about 1% to about 5%, or from about 5% to about 25%, or about 25% to about 50%, or from about 25% to about 75%, or from about 50% to about 75% or from about 75% to about 99%.

The optical filter 30 may have a reflectance and/or absorbance of about 5%, 10%, 20%, 30%, 40%, 45%, 49%, 50%, 60%, 70%, 80%, 99% or greater of the second handedness polarization of light 26. It will be understood that any and all ranges and values between these values are contemplated. In a specific example, the optical filter 30 is configured to transmit about 30% to about 90% or greater of the first handedness polarization of light 18 incident on the optical filter 30. In another example, the optical filter 30 is configured to absorb about 50% or greater (e.g., about 80% to about 100%) of the second handedness polarization of light 26 incident on the optical filter 30. Removal of the second handedness polarization of light 26 may reduce and/or eliminate a perceived glare off of the body 22. In a specific example, the optical filter 30 may include a quarter wave plate or retarder closest to a viewed object and a linear polarizer positioned on an opposite side of the quarter wave plate than the viewed body 22.

The color of the first handedness polarization of light 18 which passed through the optical filter 30 may be fairly neutral gray to avoid influencing the natural visible colors. It will be understood that a similar structure to the optical filter 30 may be positioned on the light source 14 to produce the first handedness polarization of light 18 without departing from the teachings provided herein. One such exemplary configuration is with a linear polarizer (e.g., a reflective polarizer) closest to the light source 14 and a quarter wave plate or optical retarder away from the light source 14. Another exemplary configuration is to position liquid crystal reflective circular polarizer on or proximate the light source 14. Such a configuration may be advantageous in not needing a quarter wave plate or optical retarder to produce circular or elliptically polarized light for illumination of the viewing object. Optionally, an optical retarder may be used to convert circularly polarized light or linearly polarized light to elliptically polarized light if desired.

In operation, the illumination system 10 may be used for an open cavity surgical procedure. For example, the light source 14 may be an overhead surgical light assembly which is configured to produce the first handedness polarization of light 18 as one handedness of circularly polarized light. The first handedness polarization of light 18 is emitted toward a patient having an open cavity in their body 22 (e.g., open heart surgery or other surgeries utilizing an opening in the patient's body). As the water bearing tissues of the body 22 are exposed, the first handedness polarization of light 18 may be specularly reflected by the water and converted to the second handedness polarization of light 26. For example, light (e.g., the first handedness polarization of light 18) that is specularly reflected off a wet surface may flip handedness and be perceived as glare (e.g., the second handedness polarization of light 26). The optical filter 30 may be configured as eyewear for medical personnel near the body 22 and be configured to filter out the second handedness polarization of light 26. As a result, the body 22 may appear without glare and as a result appear dry even though it is still wet. Such a feature may be advantageous in allowing details and features below the reflecting moisture to be perceived by a viewer.

Referring now to FIGS. 2A and 2B, the illumination system 10 may be part of an imaging system 38, or vice versa. The imaging system 38 may be composed of the light source 14 which is optically coupled to a first end 42A of an optical fiber 42 and configured to emit the first handedness polarization of light 18 into the optical fiber 42. Additionally or alternatively, the light source 14 may be coupled to a second end 42B of the optical fiber 42 without departing from the teachings provided herein. The optical fiber 42 is configured to emit the first handedness polarization of light 18 from the light source 14 through a second end 42B onto the body 22 and the body 22 reflects the second handedness polarization of light 26 with an opposite handedness of polarization. According to various examples, an imager 46 is positioned proximate the optical fiber 42. The optical filter 30, as described above, may be configured to absorb the second handedness polarization of light 26 incident on the optical filter 30 and transmit the first handedness polarization of light 18 incident on the optical filter 30.

According to various examples, the optical fiber 42 may be configured to transmit light therethrough. For example, the optical fiber 42 may be configured to transmit ultraviolet, visible, near-infrared, and/or infrared light between the first and second ends 42A, 42B. Further, the optical fiber 42 may be configured to transmit and maintain one or more polarizations (e.g., the first and/or second handedness polarizations of light 18, 26). The optical fiber 42 may include a core and a cladding which have a difference in refractive index relative to one another such that light launched and/or received by the optical fiber 42 is transmitted between the first and second ends 42A, 42B. In some examples, the first end 42A of the optical fiber 42 may be optically coupled with a light source while the second end 42B of the optical fiber 42 is positioned proximate the body 22. For example, the second end 42B of the optical fiber 42 may be positioned within a lumen, catheter, or other structure inserted into the body 22 such that light exiting from the second end 42B of the optical fiber 42 may illuminate a portion of the body 22. In such examples, the optical fiber 42 may be part of a larger assembly such as an arthroscope, a laparoscope, an endoscope, other medical and non-medical instruments utilizing fiber optics and combinations thereof. It will be understood that multiple optical fibers 42 may be utilized. For example, a first optical fiber 42 may be configured to transmit light into the body 22 while a second optical fiber 42 may be configured to receive reflected light from the body 22 and transmit the light out of the body 22.

The imager 46 may be a charge-coupled device (CCD) imager, a complementary metal-oxide semiconductor (CMOS) imager, other types of imagers and/or combinations thereof. According to various examples, the imager 46 may include one or more lenses to collimate and/or focus the light reflected by the body 22. It will be understood that although described as a separate element above, the optical filter 30 may be incorporated and/or integrated into the lens and/or imager 46 without departing from the teachings provided herein. As explained above, the imager 46 is positioned proximate the optical fiber 42. For example, the imager 46 may be positioned proximate the second end 42B of the optical fiber 42 (e.g., in, around and/or proximate the body 22 as depicted in FIG. 2A) or may be positioned proximate the first end 42A of the optical fiber 42 (e.g., to receive light reflected by the body 22 and transmitted through the optical fiber 42 as depicted in FIG. 2B). According to various examples, the imager 46 may be part of the larger assembly (e.g., arthroscope, endoscope, etc.) which the optical fiber 42 is positioned in.

The optical filter 30 is positioned within an imaging path of the imager 46. The imaging path of the imager 46 is the path along which reflected light from the body 22 travels to reach the imager 46. For example, the imaging path of the imager 46 may be the space between the imager 46 and the body 22 in examples where the imager 46 is positioned proximate the second end 42B of the optical fiber 42 and the body 22. In other examples, the imaging path of the imager 46 may include the first and second ends 42A, 42B as well as a body of the optical fiber 42 and any space between the optical fiber 42 and the imager 46. The optical filter 30 may be positioned on the optical fiber 42 (e.g., on the first and/or second ends 42A, 42B), on the lens of the imager 46, or even downstream of the imager 46. According to various examples, the optical filter 30 may be mechanically, electrically or electromechanically movable in and out of the imaging path of the imager 46 to selectively provide glare reduction. The imager 46 may be configured to output a digital and/or analog signal to a display such that an image may be formed from the first handedness polarization of light 18 passing through the optical filter 30. It should be noted that it is not necessary to pair the imager 46 with an optical fiber. For example, if one were interested in using the imager 46 to record a surgical operation or procedure, glare in the image could be reduced or eliminated by illuminating the body 22 with the first handedness polarization of light 18 and filtering out the second handedness polarization of light 26 using the optical filter 30 before or after the second handedness of polarization of light reaches the imager 46. It will be understood that although described in connection with the imager 46, the optical filter 30 may additionally or alternatively be configured to be operated in conjunction with the other surgical or non-surgical equipment (e.g., a microscope, a lens, robotic surgical equipment, a screen, etc.). For example, the optical filter 30 may be positioned to filter out the second handedness polarization of light 26 when using a microscope (e.g., externally or internally to the microscope) or other surgical equipment.

Referring now to FIG. 3, a method 50 of illuminating the body 22 is depicted. The method 50 may begin with a step 54 of emitting the first handedness polarization of light 18 from the light source 14. As explained above, the first handedness polarization of light 18 may be circularly or elliptically polarized light such that the step of emitting the first handedness polarization of light 18 includes emitting the first handedness polarization of light 18 as circularly or elliptically polarized light. Next, a step 58 of impinging the first handedness polarization of light 18 on the body 22 is performed. The first handedness polarization of light 18 may be transmitted from the light source 14 to impinge on the body 22 through the air (e.g., FIG. 1) and/or through the optical fiber 42 (e.g., FIGS. 2A and/or 2B). Next, a step 62 of reflecting the second handedness polarization of light 26 from the body is performed. As explained above, the as the first handedness polarization of light 18 is reflected from the body 22, a portion of the light may be reflected as the second handedness polarization of light 26. The second handedness polarization of light 26 may be produced due to specular reflection from moisture or watery films present on the body 22. In examples where the first handedness polarization of light 18 is circularly polarized light, step 62 of reflecting the second handedness polarization of light 26 may reflect the second polarization of light as a circular polarization having the opposite handedness. In other words, the first and second handedness polarizations of light 18, 26 may be oppositely circularly polarized. It will be understood that the act of reflecting one polarization of light (e.g., the first handedness polarization of light 18) off of the body 22 will produce light of the first handedness polarization of light 18, depolarized light, elliptically polarized light and/or light of the second handedness polarization of light 26. Next, a step 66 of transmitting a portion of the first handedness polarization of light 18 through an optical filter 30 is performed. Allowing the first handedness polarization of light 18 to pass through the optical filter 30 may allow the body 22 to be seen by a viewer on an opposite side of the optical filter 30 than the body 22. It will be understood that other polarizations, as well as depolarized light, may pass through the optical filter 30 such that ambient light around the body 22 may be viewed. Next and/or simultaneously with step 66, a step 70 of absorbing a portion of the second handedness polarization of light 26 by the optical filter 30 is performed. As the second handedness polarization of light 26 may be a result of undesirable reflection from the moisture of the body 22, removal of the second polarization of light may be advantageous in decreasing a perceived glare from the body 22. It will be understood that in examples where the illumination system 10 includes the imager 46, the method 50 may further include a step of imaging the transmitted first handedness polarization of light 18 using the imager 46.

Use of the present disclosure offers several advantages. First, the illuminating of the body 22 in the first handedness polarization of light 18 and the removal of the reflected second handedness polarization of light 26 allows for the removal of glare. As explained above, in examples of the body 22 which may include moisture and/or have a layer of moisture thereon may produce glare of the second handedness polarization of light 26 when illuminated. By filtering the second handedness polarization of light 26, the perceived glare off of the body 22 may be reduced. Second, by illuminating the body 22 in a single polarization of light (e.g., either the first or second handedness polarization of light 18, 26) a filter configured to absorb or reflect a single polarization of light may be used. Such a feature may be advantageous in not requiring a tradeoff between illumination and glare. For example, in traditional illumination used in a medical setting (e.g., the body is a human and/or animal body), a medical professional often traditionally needs to balance the level of illumination with the level of glare. Use of the illumination system 10 and/or imaging system 38 utilizing the first handedness polarization of light 18 and the optical filter 30 allows for the glare (e.g., the second handedness polarization of light 26) to be removed while transmitting the first handedness polarization of light 18. As such, the body 22 may be illuminated to a desired level without the worry of the accompanying glare. Third, use of circularly polarized examples of the first and second handedness of light 18, 26 may be advantageous in providing rotationally independent glare reduction. For example, conventional glare reduction systems which filter linear polarized light may require a specific orientation between the filter and the reflecting body, otherwise the glare may seep through. Circularly polarized examples of the first and second handedness of light 18, 26 and the optical filter 30 may reduce and/or eliminate glare regardless of the orientation of the filter 30. In other words, the perceived intensity of the glare may be the same regardless of rotation of the optical filter 30. Such a feature may be advantageous in allowing a surgeon or the imager 46 to move freely without the fear of perceiving glare. It will be understood that elliptically polarized examples may also benefit from this aspect as well.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

What is claimed is:

1. An illumination system, comprising:
   a light source configured to emit a first handedness polarization of light onto a body, the first handedness polarization of light having at least one of a circular and an elliptical polarization, wherein the body reflects a second handedness polarization of light that is opposite of the first handedness polarization of light; and
   an optical filter configured to at least one of absorb and reflect the second handedness polarization of light and transmit the first handedness polarization of light, the optical filter including a dual brightness enhancement film and at least one of the following:
   a quarter wave plate;
   an optical retarder; and
   a liquid crystal material.

2. The illumination system of claim 1, wherein the body is a body tissue.

3. The illumination system of claim 2, wherein the body tissue comprises water.

4. The illumination system of claim 1, wherein at least one of the first and second handedness polarizations of light is circularly polarized light.

5. The illumination system of claim 4, wherein the first and second polarizations of light have an opposite handedness of circularly polarized light.

6. The illumination system of claim 1, wherein the optical filter is configured to transmit about 50% or greater of the first handedness polarization of light incident on the optical filter.

7. The illumination system of claim 1, wherein the optical filter is configured to absorb about 50% or greater of the second handedness polarization of light incident on the optical filter.

8. The illumination system of claim 1, wherein the optical filter comprises a screen.

9. The illumination system of claim 1, wherein the optical filter comprises eyewear.

10. An imaging system, comprising:
    a light source optically coupled to a first end of an optical fiber and configured to emit a first handedness polarization of light into the optical fiber, wherein the optical fiber is configured to emit the first handedness polarization of light through a second end of the optical fiber onto a body and the body reflects a second handedness polarization of light that is opposite of the first handedness of light;
    an imager positioned proximate the optical fiber; and
    an optical filter having an absorbing polarizer configured to absorb the second handedness polarization of light incident on the optical filter and transmit the first handedness polarization of light incident on the optical filter, wherein the optical filter absorbs at least 50% of the second handedness polarization of light incident on the optical filter.

11. The imaging system of claim 10, wherein at least one of the first and second handedness polarizations of light is circularly polarized light.

12. The imaging system of claim 10, wherein the imager is positioned proximate the first end of the optical fiber.

13. The imaging system of claim 12, wherein the optical fiber is configured to transmit the second handedness polarization of light.

14. The imaging system of claim 10, wherein the imager is positioned proximate the second end of the optical fiber.

15. The imaging system of claim 10, wherein the first and second handedness polarizations of light have opposite handedness circularly polarized light.

16. The imaging system of claim 10, wherein the optical filter is positioned within an imaging path of the imager.

17. A method of illuminating body tissue, comprising:
    emitting a first handedness polarization of light from a light source;
    impinging the first handedness polarization of light on said body tissue;
    reflecting a second handedness polarization of light from said body tissue that is opposite of the first handedness of light;
    transmitting a portion of the first handedness polarization of light through an optical filter having a linear polarizer and a quarter wave plate; and
    absorbing a portion of the second handedness polarization of light by the optical filter.

18. The method of claim 17, wherein reflecting the second handedness polarization of light further comprises:
    reflecting the second handedness polarization of light as circularly polarized light.

19. The method of claim 17, further comprising the step of:
    imaging the transmitted first handedness polarization of light.

20. The method of claim 17, wherein emitting the first handedness polarization of light further comprises:

emitting the first handedness polarization of light as circularly polarized light.

\* \* \* \* \*